United States Patent Office 2,754,271
Patented July 10, 1956

2,754,271
METHOD OF BREAKING WATER-IN-OIL EMULSIONS

Willard H. Kirkpatrick, Sugar Land, Tex., assignor to Visco Products Company, Sugar Land, Tex., a corporation of Delaware No Drawing. Application April 11, 1951,
Serial No. 220,521

11 Claims. (Cl. 252—331)

This invention relates in particular to the treatment of emulsions of mineral oil and water, such as petroleum emulsions commonly encountered in the production, handling and refining of crude mineral oil, for the purpose of separating the oil from the water. Also, the invention relates to the treatment of other water-in-oil types of emulsions wherein the emulsions are produced artificially or naturally and the resolution of the emulsions presents a problem of recovery or disposal.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B. S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Another type of process involves the use of a demulsifying agent of the kind hereinafter described in acidizing operations on petroleum producing strata. In such an operation corrosion inhibited acid is forced down the well and into the formation under pressure. The acid attacks limestone formation enlarging the fissures and openings through which the oil fluids flow to the well pool, thus increasing the production. In many cases, particularly troublesome emulsions are encountered immediately after a well has been acidized. This condition can be minimized and many times eliminated by incorporating a suitable demulsifying composition with the acidizing medium.

Still another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

One object of the invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where surface-active characteristics are necessary or desirable.

The treating agents employed in accordance with this invention can be described as addition products of an alkylene oxide which is either 1,2-propylene oxide, or a mixture of ethylene oxide and 1,2-propylene oxide, with an aliphatic dihydric alcohol, there being at least ⅓ part of 1,2-propylene oxide for each part of ethylene oxide by weight, preferably 1 to 3 parts of 1,2-propylene oxide for each part of ethylene oxide by weight. The molecular weight attributable to the 1,2-propylene oxide is preferably at least 1200.

When the weight ratio of ethylene oxide to 1,2-propylene oxide is 3:1, the molecular weights of the addition products can be very high, e. g., 120,000. As the ratio of ethylene oxide to 1,2-propylene oxide is decreased the molecular weights of the addition products which can be produced are lower. In most instances, where the addition product is made from a mixture of ethylene oxide and 1,2-propylene oxide in which the weight ratio of 1,2-propylene oxide to ethylene oxide is at least 1:1 but not more than 9:1, the molecular weights of compounds employed for the purpose of the present invention will be within the range of about 1500 to about 6000. Polyoxypropylene diols are known which have molecular weights as high as about 3000.

Addition products of mixtures of ethylene oxide and 1,2-propylene oxide with aliphatic dihydric alcohols suitable for breaking water-in-oil emulsions in accordance with the present invention are described in U. S. 2,425,845. Any of the addition products described in this patent is suitable for the practice of the present invention provided it has a molecular weight of at least 1000 attributable to 1,2-propylene oxide.

It will be noted that the aliphatic alcohols used as starting materials in making the end products employed for the purpose of the invention have two terminal hydroxyl groups attached to different carbon atoms and that the end products also contain two terminal hydroxyl groups attached to different carbon atoms.

By way of illustrating the effectiveness of the products contemplated by this invention, the method of testing their efficiency in bottle tests will be described and exemplary data given.

EXAMPLE I

Field bottle tests were made on samples of emulsified oil taken from the Stanolind oil and gas field at Hastings, Texas. A sample grind out showed that these emulsions contained about 50 parts of water per 100 parts of emulsion. A gun barrel system was being used in the field.

One hundred (100) cc. samples were taken and placed in conventional field test bottles. A finding ratio test indicated a treating ratio of 0.06 cc. of a 5% solution of the treating chemical was required per 100 cc. of sample.

Every effort was made to maintain conditions comparable to those present in a full scale plant treatment.

The test chemical was added to the samples in the test bottles and each bottle was agitated by shaking it 200 times at atmospheric temperatures. The compositions in the test bottles were then allowed to settle and were tested for water drop at predetermined periods of time.

After cold agitation each sample was heated to a temperature of 140° F. and shaken an additional 100 times. After agitation at the elevated temperatures the samples were allowed to stand to permit settling and stratification of the water and were again tested for water drop.

The compositions hereinafter described as Ucon materials are products of Carbide and Carbon Chemicals Corporation. In these compositions the letter "H" signifies that the compositions are heteric in that they are made from both ethylene oxide and 1,2-propylene oxide. The letters "DG" indicate that the starting aliphatic dihydric alcohol is diethylene glycol.

The composition identified as Ucon 75–H–1400, which is the addition product with diethylene glycol of ethylene oxide and 1,2-propylene oxide in a weight ratio of approximately 3:1 having a molecular weight of approximately 1400 caused 30 out of the 50 parts of water to separate before the bottles were given hot agitation and 45 parts out of the 50 parts of the water to separate after hot agitation.

The period of time used in testing the samples after cold agitation was 15 minutes and after hot agitation was 30 minutes.

EXAMPLE II

With the same procedure as described in Example I, the composition identified as Ucon 75–H–6000, which is the addition product with diethylene glycol of ethylene oxide and 1,2-propylene oxide in a weight ratio of approximately 3:1 having a molecular weight of approximately 6000 caused 40 out of the 50 parts of water to separate before the bottles were given hot agitation and 48 out of the 50 parts of water to separate after hot agitation.

EXAMPLE III

With the same procedure as described in Example I, the composition identified as Ucon 75–H–90,000, which is the addition product with diethylene glycol of ethylene oxide and 1,2-propylene oxide in a weight ratio of approximately 3:1 having a molecular weight of approximately 90,000 caused 40 out of the 50 parts of water to separate before the bottles were given hot agitation and 48 out of the 50 parts of water to separate after hot agitation.

EXAMPLE IV

With the same procedure as described in Example I, the composition identified as Ucon 40–HDG–499, which is the addition product with diethylene glycol of ethylene oxide and 1,2-propylene oxide in a weight ratio of approximately 2:3 having a molecular weight of approximately 1375 caused 30 out of the 50 parts of water to separate before the bottles were given hot agitation and 40 out of the 50 parts of water to separate after hot agitation.

EXAMPLE V

With the same procedure as described in Example I, the composition identified as Ucon 40–HDG–755, which is the addition product with diethylene glycol of ethylene oxide and 1,2-propylene oxide in a weight ratio of approximately 2:3 having a molecular weight of approximately 1850 caused 38 out of the 50 parts of water to separate before the bottles were given hot agitation and 45 out of the 50 parts of water to separate after hot agitation.

EXAMPLE VI

With the same procedure as described in Example I, the composition identified as Ucon 40–HDG–1026, which is the addition product with diethylene glycol of ethylene oxide and 1,2-propylene oxide in a weight ratio of approximately 2:3 having a molecular weight of approximately 2250 caused 40 out of the 50 parts of water to separate before the bottles were given hot agitation and 46 out of the 50 parts of water to separate after hot agitation.

EXAMPLE VII

With the same procedure as described in Example I, the composition identified as Ucon 40–HDG–1703, which is the addition product with diethylene glycol of ethylene oxide and 1,2-propylene oxide in a weight ratio of approximately 2:3 having a molecular weight of approximately 3100 caused 43 out of the 50 parts of water to separate before the bottles were given hot agitation and 48 out of the 50 parts of water to separate after hot agitation.

EXAMPLE VIII

With the same procedure as described in Example I, the composition identified as Ucon 40–HDG–2412, which is the addition product with diethylene glycol of ethylene oxide and 1,2-propylene oxide in a weight ratio of approximately 2:3 having a molecular weight of approximately 3800 caused 45 out of the 50 parts of water to separate before the bottles were given hot agitation and 48 out of the 50 parts of water to separate after hot agitation.

EXAMPLE IX

With the same procedure described in Example I, the composition identified as Ucon 25–HDG–510, which is the addition product with diethylene glycol of ethylene oxide and 1,2-propylene oxide in a weight ratio of approximately 1:3 having a molecular weight of approximately 1500 caused 35 out of the 50 parts of water to separate before the bottles were given hot agitation and substantially the same amount after hot agitation.

EXAMPLE X

With the same procedure described in Example I, the composition identified as Ucon 25–HDG–876, which is the addition product with diethylene glycol of ethylene oxide and 1,2-propylene oxide in a weight ratio of approximately 1:3 having a molecular weight of approximately 2200 caused 40 out of the 50 parts of water to separate before the bottles were given hot agitation and substantially the same amount after hot agitation.

EXAMPLE XI

With the same procedure as described in Example I, the composition identified as Ucon 25–HDG–1156, which is the addition product with diethylene glycol of ethylene oxide and 1,2-propylene oxide in a weight ratio of approximately 1:3 having a molecular weight of approximately 2600 caused 40 out of the 50 parts of water to separate before the bottles were given hot agitation and substantially the same amount after hot agitation.

EXAMPLE XII

With the same procedure described in Example I, the composition identified as Ucon 25–HDG–2157, which is the addition product with diethylene glycol of ethylene oxide and 1,2-propylene oxide in a weight ratio of approximately 1:3 having a molecular weight of approximately 4000 caused 40 out of the 50 parts of water to separate before the bottles were given hot agitation and 48 out of the 50 parts of water to separate after hot agitation.

EXAMPLE XIII

With the same procedure as described in Example I, the composition identified as Ucon 10–HDG–373, which is the addition product with diethylene glycol of ethylene oxide and 1,2-propylene oxide in a weight ratio of approximately 1:9 having a molecular weight of approximately 1150 caused 18 out of the 50 parts of water to separate before the bottles were given hot agitation and 23 out of the 50 parts of water to separate after hot agitation.

EXAMPLE XIV

With the same procedure as described in Example I, the composition identified as Ucon 10–HDG–506, which is the addition product with diethylene glycol of ethylene oxide and 1,2-propylene oxide in a weight ratio of approximately 1:9 having a molecular weight of approximately 1600 caused 23 out of the 50 parts of water to separate before the bottles were given hot agitation and 26 out of the 50 parts of water to separate after hot agitation.

EXAMPLE XV

With the same procedure as described in Example I, the composition identified as Ucon 10-HDG-700, which is the addition product with diethylene glycol of ethylene oxide and 1,2-propylene oxide in a weight ratio of approximately 1:9 having a molecular weight of approximately 2100 caused 25 out of the 50 parts of water to separate before the bottles were given hot agitation and 32 out of the 50 parts of water to separate after hot agitation.

EXAMPLE XVI

With the same procedure as described in Example I, the composition identified as Ucon 10-HDG-1682, which is the addition product with diethylene glycol of ethylene oxide and 1,2-propylene oxide in a weight ratio of approximately 1:9 having a molecular weight of approximately 3600 caused 37 out of the 50 parts of water to separate before the bottles were given hot agitation and 40 out of the 50 parts of water to separate after hot agitation.

EXAMPLE XVII

With the same procedure as described in Example I, a polyoxypropylene glycol having a molecular weight of 1525 caused 15 out of the 50 parts of water to separate before the bottles were given hot agitation and 23 out of the 50 parts of water to separate after hot agitation.

EXAMPLE XVIII

With the same procedure as described in Example I, a polyoxypropylene glycol having a molecular weight of 2000 caused 23 out of the 50 parts of water to separate before the bottles were given hot agitation and 25 out of the 50 parts of water to separate after hot agitation.

EXAMPLE XIX

With the same procedure as described in Example I, a polyoxypropylene glycol having a molecular weight of 2725 caused 30 out of the 50 parts of water to separate before the bottles were given hot agitation and 37 out of the 50 parts of water to separate after hot agitation.

In a similar manner the composition identified as Ucon 75-H-150 which is like the composition used in Example I except that the molecular weight was only 150, a polyoxypropylene glycol having a molecular weight of 750 and a polyoxypropylene glycol having a molecular weight of 1025 were tested as described in Example I but did not produce a sufficient water drop to merit further consideration. These tests demonstrated, however, that the treating effectiveness increased with an increase in molecular weight. In general, this holds true with molecular weights up to 3000.

A second generalization can be made, namely, that the molecular weight required to secure a given treating efficiency may be lower when the hydrophilic and hydrophobic characteristics are more nearly in balance. Thus, where the weight ratio of ethylene oxide to propylene oxide is approximately 1:9 the treating effectiveness in breaking water-in-oil emulsions of a composition having an average molecular weight of approximately 2500 compares with the treating effectiveness of a composition having a molecular weight of 1800 in which the ethylene oxide to propylene oxide (or hydrophilic to hydrophobic) weight ratio is 2:3.

The most effective compositions in the foregoing tests were Ucon 40-HDG-1026, Ucon 40-HDG-1703, Ucon 40-HDG-2412, Ucon 25-HDG-2157, Ucon 75-H-6000 and Ucon 75-H-90,000.

It should be understood that the results will vary somewhat depending upon the emulsion being treated.

Although in the foregoing examples the compositions tested were derived by reacting mixtures of ethylene oxide and 1,2-propylene oxide with diethylene glycol or by reacting 1,2-propylene oxide with dipropylene glycol, it will be understood that any of the aliphatic dihydric alcohols described in U. S. Patent 2,425,845 and any other aliphatic dihydric alcohols may be employed in these reactions to produce addition products suitable for the practice of this invention. The lower molecular weight glycols such as diethylene glycol, dipropylene glycol, butylene glycol and homologous glycols having not more than six carbon atoms are readily available as starting materials. These glycols are also more hydrophilic than the higher molecular weight glycols such as decamethylene glycol. However, the major portion of the molecular weight of the resultant compound is attributable to the 1,2-propylene oxide or to both 1,2-propylene oxide and ethylene oxide, the molecular weight attributable to the starting glycol or aliphatic dihydric alcohol being usually less than about 10% of the resultant product.

For the sake of completeness and in order that there will be no misunderstanding as to the composition of the products contemplated for use in the practice of the invention, the following examples are given to illustrate the preparation of some of these addition products.

EXAMPLE XX

This example illustrates the preparation of addition products with aliphatic dihydric alcohols of ethylene oxide and 1,2-propylene oxide in which the weight ratio of ethylene oxide to 1,2-propylene oxide is 3:1.

A mixture containing 75 parts of ethylene oxide and 25 parts of 1,2-propylene oxide was supplied to a reactor charged with 20 parts of diethylene glycol and 0.8 parts of dry, powdered sodium hydroxide. The ethylene oxide had a water content of about 0.09% and an acetaldehyde content of about 0.06% and the propylene oxide had a water content of about 0.05% and a propionaldehyde content of about 0.15%. The water content of the diethylene glycol was about 0.15%. The pressure maintained during the introduction of the oxide mixture was about 8 to 18 p. s. i. over a period of about 1.9 hours, and thereafter the mixture was cycled for a period of about 1 hour. During the reaction the temperature was held at 94° to 105° C.

Following the same procedure additional diol compositions having an oxide ratio of 3:1 were produced by utilizing the product of one reaction as a starting material for diol compositions of higher viscosity and increased average molecular weight.

EXAMPLE XXI

This example illustrates the preparation of addition products with aliphatic dihydric alcohols of ethylene oxide and 1,2-propylene oxide in which the weight ratio of ethylene oxide to 1,2-propylene oxide is 2:3.

Step 1.—A polyoxyalkylene glycol starting material of relatively low molecular weight was made by introducing a mixture of 2 parts of ethylene oxide and 3 parts of 1,2-propylene oxide into a suitable reactor charged with 20 parts of diethylene glycol and 1.56 parts of dry, powdered sodium hydroxide intimately dispersed therein. The moisture content of the diethylene glycol was about 0.15% and of the mixed oxides, about 0.07%.

The reaction mixture was vigorously agitated and maintained at a temperature of about 119° to 127° C. throughout the reaction. About 18 minutes were required to feed in the oxides which were supplied at a rate to maintain a pressure of about 16 p. s. i. After all the oxides had been fed in, the reaction mixture was recycled for a period of 30 minutes.

Step 2.—A mixture of ethylene oxide and 1,2-propylene oxide in the ratio of 2:3 respectively, were introduced into a reactor containing 20 parts of the product of Step 1 at a rate to maintain a pressure of about 22 to 30 p. s. i. No additional sodium hydroxide was added and the moisture content of the oxides was the same as in Step 1. A temperature of about 111° to 122° C. was maintained during the reaction and the reaction mixture recycled for about ½ hour after all the oxides had been introduced. The product was a liquid which was found to have an alkalinity calculated as sodium hydroxide of about 0.78%.

In accordance with the foregoing procedure several products were prepared in which the molecular weight was varied by using increasing quantities of the mixture of alkylene oxides. There were also slight differences in the reaction temperatures and pressures but they were minor.

The following products were prepared and possessed properties and specifications as presented in the following table:

*Table I*

| Viscosity: | | | | | |
|---|---|---|---|---|---|
| SUS at 100° F | 499 | 755 | 1,026 | 1,703 | 2,412 |
| SUS at 210° F | 87 | 126 | 167 | 274 | 422 |
| Average Molecular Weight: | | | | | |
| Menzies-Wright Method | 1,660 | 2,225 | 2,800 | -------- | 2,755 |
| From Percent Hydroxyl | 1,313 | 1,647 | 2,115 | 3,162 | 2,832 |
| Specific Gravity, 20/20° C | 1.0650 | 1.0535 | 1.0535 | 1.0532 | 1.0538 |
| Flash Point, °F | 465 | 475 | 460 | 440 | 470 |
| Fire Point, °F | 540 | 550 | 550 | 530 | 510 |
| Water, Percent | 0.59 | 0.12 | 0.14 | 0.15 | 0.44 |
| Color, Pt-Co | 500 | 500 | 500 | 400 (b) | 120 (b) |

The products were all liquids at atmospheric temperature and were miscible with water.

EXAMPLE XXII

This example illustrates the preparation of addition products with aliphatic dihydric alcohols of ethylene oxide and 1,2-propylene oxide in which the weight ratio of ethylene oxide to 1,2-propylene oxide is 1:3.

Using as starting material 20 parts of diethylene glycol and 1 part of dry, powdered sodium hydroxide contained in a suitable reactor, diol compositions were made by subjecting it to varying quantities of an oxide mixture having an ethylene oxide to 1,2-propylene oxide ratio of 1:3 over a period of approximately 2.5 hours at a pressure of about 30 to 35 p. s. i. During the reaction the temperature was held at 109° to 121° C. and the reaction mixture was recycled for a period of 1.5 hours after all the oxides had been introduced. The oxide mixture contained 0.08 per cent of water and 0.01% of aldehyde as acetaldehyde.

Several compositions were prepared with varying molecular weights by increasing the quantity of the oxide mixture introduced into the reactor. The properties of these several compositions are tabulated below.

*Table II*

| Viscosity: | | | | |
|---|---|---|---|---|
| SUS at 100° F | 510 | 876 | 1156 | 2157 |
| SUS at 210° F | 88 | 141 | 186 | 338 |
| Average Molecular Weight: | | | | |
| Menzies-Wright Method | 1,560 | 2,570 | 2,800 | -------- |
| From Percent Hydroxyl | 1,360 | 2,090 | 2,420 | 3,278 |
| Specific Gravity, 20/20° C | 1.0415 | 1.0582 | 1.0380 | 1.0378 |
| Flash Point, °F | 485 | 465 | 460 | 445 |
| Fire Point, °F | 510 | 580 | 610 | 520 |
| Water, Percent | 0.33 | 0.15 | 0.14 | 0.55 |
| Color, Pt-Co | 2,000 | amber | 11 (b) | 1,000 |

These products were slightly viscous liquids which were miscible with cold water in all proportions but at a temperature of about 80° to 90° C. several phases were formed from an aqueous solution.

EXAMPLE XXIII

This example illustrates the preparation of addition products with aliphatic dihydric alcohols of ethylene oxide and 1,2-propylene oxide in which the weight ratio of ethylene oxide to 1,2-propylene oxide is 1:9.

*Step 1.*—Into a reactor charged with 30 parts of propylene glycol and 0.5 part of dry, flake sodium hydroxide was introduced 80 parts of an oxide mixture having an oxide ratio of 10:90. The mixture was introduced at a rate to maintain a pressure of not more than about 50 p. s. i.; the temperature was held at 110° to 120° C., and about 5.5 hours were required to complete the reaction. To 30 parts of the resulting reaction mixture were then added 0.5 part of dry, flake sodium hydroxide and 34 parts of an oxide mixture having the same oxide ratio, 10:90, as before. The temperature was held at 108° to 115° C., the pressure at 0 to 45 p. s. i., and 3.25 hours were required for the reaction to be completed. The unneutralized reaction product was used as the starting material in the following step.

*Step 2.*—To 56 parts of the unneutralized product of the preceding step was added 150 parts of an oxide mixture having a ratio as above of 10:90. The pressure was held at 10 to 55 p. s. i., the temperature at 108° to 120° C., and a period of 5 hours was required to complete the reaction. A part of the product was neutralized with carbon dioxide followed by extraction with water to remove sodium carbonate. The neutralized reaction product was then stripped of water and low-boiling constituents by heating under a reduced pressure as low as 20 millimeters of mercury and an elevated temperature as high as 165° C., and thereafter filtered while hot.

Following the same procedure, 3 additional diol compositions having an oxide ratio of 10:90 were prepared by utilizing the product of 1 reaction as the starting material for a diol composition of higher viscosity and increased average molecular weight. The properties of the diol compositions thus obtained are tabulated below:

*Table III*

| Viscosity: | | | | |
|---|---|---|---|---|
| SUS at 100° C | 373 | 506 | 700 | 1,682 |
| SUS at 210° F | 68.2 | 85.3 | 112 | 251 |
| Average Molecular Weight: | | | | |
| Menzies-Wright Method | 1,335 | 1,570 | 1,607 | 2,274 |
| From Percent Hydroxyl | 1,045 | 1,348 | 1,672 | 3,190 |
| Specific Gravity, 20/20° C | 1.0268 | 1.0230 | 1.0252 | 1.065 |
| Flash Point, °F | 485 | 464 | 458 | 445 |
| Fire Point, °F | 525 | 582 | 548 | 520 |
| Water, Percent | 0.77 | 0.11 | 0.21 | 0.70 |
| Color, Pt-Co | 150 | 11(b) | 10.5(b) | 500 |

The demulsifying compositions of the present invention are preferably employed in the proportion of 1 part of demulsifying agent to from 10,000 to 100,000 parts of emulsion either by adding the concentrated product directly to the emulsion or after diluting with a suitable vehicle in the customary manner.

For the most effective treat within the above described proportions, it is preferable that the addition product employed have a minimum molecular weight of at least 5000 where the ethylene oxide to 1,2-propylene oxide ratio is 3:1; a minimum molecular weight of at least 1500 where the ethylene oxide to 1,2-propylene oxide ratio is 1:1; a minimum molecular weight of at least 1800 where the weight ratio of ethylene oxide to 1,2-propylene oxide is 2:3; a minimum molecular weight of at least 2200 where the weight ratio of ethylene oxide to 1,2-propylene oxide is 1:3; and a minimum molecular weight of at least 2500 where the weight ratio of ethylene oxide to 1,2-propylene oxide is 1:9. The polyoxypropylene glycols are generally less effective than the addition products derived from mixtures of ethylene oxide and 1,2-propylene oxide containing at least ⅓ part of 1,2-propylene oxide per part of ethylene oxide and not more than 9 parts of 1,2-propylene oxide per part of ethylene oxide. However, the polyoxypropylene glycols can be used satisfactorily provided somewhat larger proportions are employed.

Among the suitable hydrocarbon vehicles which can be employed as diluents is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and are suitable for use in breaking water-in-oil petroleum emulsions in the mid-continent oil fields, including Oklahoma, Illinois, Kansas, the Gulf coast, Louisiana, Southwest Texas and California.

This application is a continuation-in-part of copending application, Serial No. 98,162, filed June 9, 1949.

The invention is hereby claimed as follows:

1. A process of breaking water-in-oil emulsions which comprises treating such emulsions with an addition product of an aliphatic dihydric alcohol having two terminal hydroxyl groups connected to different carbon atoms and having not more than six carbon atoms and an alkylene oxide from the group consisting of 1,2-propylene oxide and both ethylene oxide and 1,2-propylene oxide containing at least ⅓ part by weight of 1,2-propylene oxide per part of ethylene oxide and not more than 3 parts by weight of ethylene oxide per part of 1,2-propylene oxide, the average molecular weight attributable to said oxides being at least 1000 where said oxides are both ethylene oxide and 1,2-propylene oxide and at least 1200 where said oxide is solely 1,2-propylene oxide, said addition product having two terminal hydroxyl groups attached to different carbon atoms.

2. A process of breaking water-in-oil emulsions which comprises treating such emulsions with an addition product of an alphatic dihydric alcohol having two terminal hydroxyl groups connected to different carbon atoms and having not more than six carbon atoms and an alkylene oxide from the group consisting of 1,2-propylene oxide and both ethylene oxide and 1,2-propylene oxide containing at least ⅓ part by weight of 1,2-propylene oxide per part of ethylene oxide and not more than 3 parts by weight of ethylene oxide per part of 1,2-propylene oxide, the average molecular weight attributable to 1,2-propylene oxide being at least 1200, and having two terminal hydroxyl groups attached to different carbon atoms.

3. A process of breaking water-in-oil emulsions which comprises treating such emulsions with an addition product of an aliphatic dihydric alcohol having two terminal hydroxyl groups connected to different carbon atoms and having not more than six carbon atoms and both ethylene oxide and 1,2-propylene oxide, said addition product having an average molecular weight of at least 1000 attributable to 1,2-propylene oxide, the weight ratio of ethylene oxide to 1,2-propylene oxide being within the range of 3:1 to 1:9, and having two terminal hydroxyl groups attached to different carbon atoms.

4. A process of breaking water-in-oil emulsions which comprises treating such emulsions with an addition product of aliphatic dihyric alcohol having two terminal hydroxyl groups connected to different carbon atoms and having not more than six carbon atoms and 1,2-propylene oxide, said addition product having an average molecular weight in excess of 1200 but not more than 3000, and having two terminal hydroxyl groups attached to different carbons atoms.

5. A process of breaking water-in-oil emulsions which comprises treating such emulsions with an addition product of diethylene glycol and both ethylene oxide and 1,2-propylene oxide in an approximate weight ratio of 3:1, the average molecular weight being at least 5000 and not more than 120,000.

6. A process of breaking water-in-oil emulsions which comprises treating such emulsions with an addition product of diethylene glycol and both ethylene oxide and 1,2-propylene oxide in an approximate weight ratio of 1:1, the average molecular weight being at least 1500 and not more than 6,000.

7. A process of breaking water-in-oil emulsions which comprises treating such emulsions with an addition product of diethylene glycol and both ethylene oxide and 1,2-propylene oxide in an approximate weight ratio of 2:3, the average molecular weight being at least 1800 and not more than about 3800.

8. A process of breaking water-in-oil emulsions which comprises treating such emulsions with an addition product of diethylene glycol and both ethylene oxide and 1,2-propylene oxide in an approximate weight ratio of 1:3, the average molecular weight being at least 2200 and not more than about 4,000.

9. A process of breaking water-in-oil emulsions which comprises treating such emulsions with an addition product of diethylene glycol and both ethylene oxide and 1,2-propylene oxide in an approximate weight ratio of 1:9, the average molecular weight being at least 2500 and not more than about 3600.

10. A process of breaking water-in-oil emulsions which comprises treating such emulsions with a polyoxyalkylene diol having a single long acyclic chain in which ethylene oxide and 1,2-propylene oxide are combined therein as oxyethylene and oxy-1,2-propylene groups in a ratio which is at least ⅓ part of 1,2-propylene oxide for each part of ethylene oxide by weight and not more than 3 parts of ethylene oxide per part of 1,2-propylene oxide by weight, the average molecular weight being at least 1500.

11. A process of breaking water-in-oil emulsions which comprises treating such emulsions with a polyoxyalkylene diol having a single long acyclic chain in which ethylene oxide and 1,2-propylene oxide are combined therein as oxyethylene and oxy-1,2-propylene groups in a ratio which is at least ⅓ part of 1,2-propylene oxide for each part of ethylene oxide by weight and not more than 3 parts of ethylene oxide per part of 1,2-propylene oxide by weight, with the further proviso that an average molecular weight of at least 1000 is attributable to 1,2-propylene oxide.

References Cited in the file of this patent

UNITED STATES PATENTS

| | | |
|---|---|---|
| 2,527,970 | Sokol | Oct. 31, 1950 |
| 2,549,437 | De Groote | Apr. 17, 1951 |
| 2,552,533 | De Groote | May 15, 1951 |
| 2,554,667 | De Groote | May 29, 1951 |

OTHER REFERENCES

"Ucon" Fluids and Lubricants, Carbide and Carbon Chemicals Corp., Apr. 1, 1949, page 12.